July 17, 1934.  L. N. CRICHTON ET AL  1,967,200
PROTECTIVE RELAY SYSTEM
Filed March 20, 1930   2 Sheets-Sheet 2
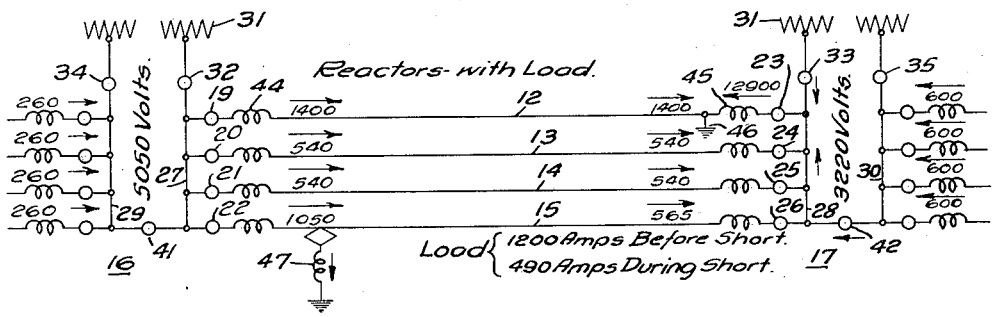
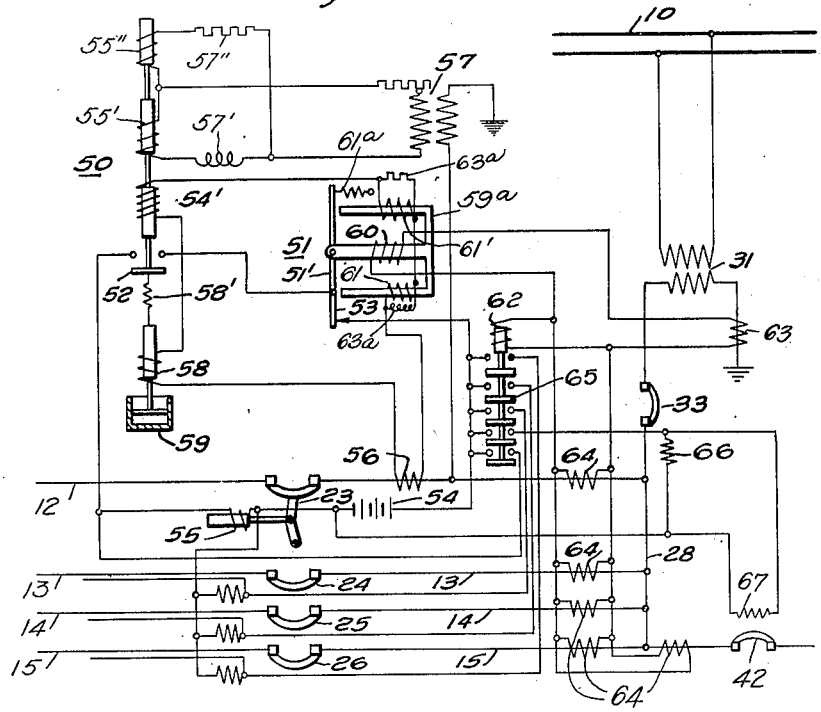
INVENTOR
Leslie N. Crichton and
Herbert C. Graves.
BY
ATTORNEY Patented July 17, 1934

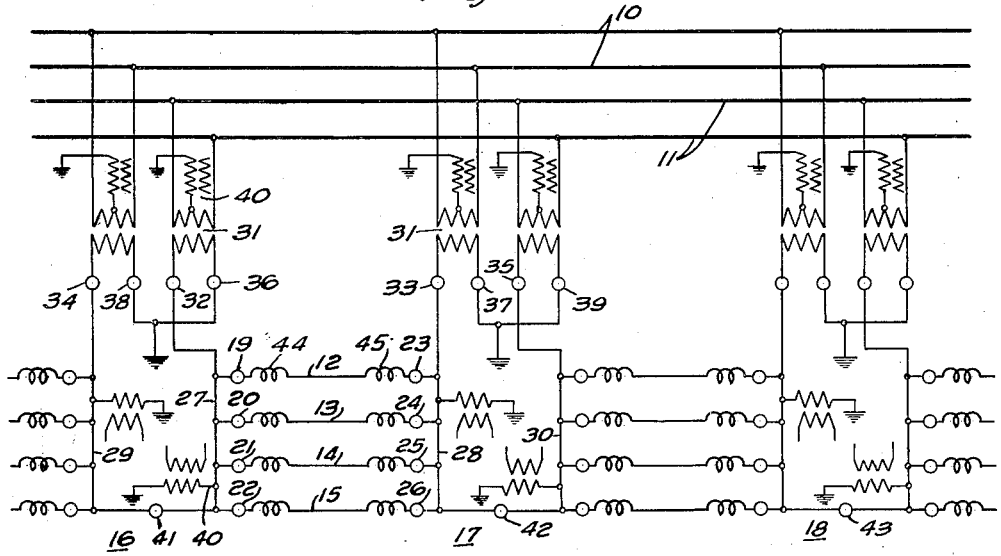

1,967,200

UNITED STATES PATENT OFFICE 1,967,200

PROTECTIVE RELAY SYSTEM

Leslie N. Crichton, East Orange, N. J., and Herbert C. Graves, Jr., Upper Darby, Pa., assignors to Westinghouse Electric and Manufacturing Company, a corporation of Pennsylvania Application March 20, 1930, Serial No. 437,924

28 Claims. (Cl. 175—294)

This application is a substitute for, and a continuation-in-part of, our application Serial No. 393,433, filed September 18, 1929.

Our invention concerns protective systems for electric-distribution circuits and, more particularly, protective systems for electric-railway power circuits.

The principal objects of our invention are to effect the prompt isolation of any trolley feeder of an electric-railway distribution circuit on which a fault occurs and, at the same time, to maintain service on all other portions of the circuit.

Another object of our invention is to provide means for obviating the effect of load currents on the operation of the protective relays.

Another object of our invention is to isolate a feeder circuit only when the energy traversing the said circuit is supplied in a predetermined direction.

A still further object of our invention is to provide an improved relay system for protecting a railway distribution circuit from a number of fault conditions both on the feeder circuits and in the substations.

For a thorough understanding of our invention, reference is made to the accompanying drawings of which:

Figure 1 is a schematic illustration of an electric-distribution system for a multi-track railway;

Fig. 2 is a similar illustration of a portion of said circuit indicating the direction and magnitude of load and fault currents under given conditions; and Fig. 3 is a detailed illustration of a portion of the protective apparatus which we propose to employ in connection with the circuits shown in Figs. 1 and 2.

Referring particularly to Fig. 1, the usual alternating-current electric-distribution system for railway service comprises a high-voltage transmission line, such as that shown at 10, which, for the purpose of ensuring continuous service, may be duplicated by a similar circuit 11. Energy is supplied to the motive equipment of the railway from trolley conductors or contact lines 12, 13, 14 and 15. The contact lines are adapted to be sectionalized by circuit breakers located at convenient stations along the line of the railway, such as 16, 17 and 18. The circuit breakers for controlling the connection of the conductors 12, 13, 14 and 15 to their energy sources, together with their associated protective relays, are indicated by small circles shown at 19 to 26.

When the circuit breakers 19 to 26 are closed, the conductors 12 to 15 will be connected to the buses 27 and 28 at the substations 16 and 17. Similar buses 29 and 30 at said stations are adapted to supply energy to conductors of adjoining sections. Each of the substation buses 27 to 30 is connected to an energy-supplying electrical translating device, such as one terminal of the secondary winding of a step-down transformer, as shown at 31, through circuit breakers which are indicated schematically, together with their relay control equipment, at 32, 33, 34 and 35. The other terminal of the secondary winding of the step-down transformers is adapted to be grounded through the circuit breakers which are indicated, together with their associated relays at 36, 37, 38 and 39. The primary windings of the transformers are connected to the high-voltage transmission lines 10 and 11 through any desirable circuit breakers and disconnecting switches.

Potential transformers 40 are provided at numerous points in the distribution circuit for purposes of metering and protection. The circuit breakers and relay control equipment, indicated by the small circles 41, 42 and 43, are adapted to connect the buses of the substations 16, 17 and 18 under suitable conditions.

In addition to the elements already described, we may utilize impedance devices in the form of reactors 44 and 45 at the ends of each section of the trolley conductors, although the system of our invention will be found satisfactorily operative without this added refinement in many cases.

In a copending application of Robert D. Evans, Serial No. 218,103, filed September 7, 1927, for Protective relay system using reactors, patented December 15, 1931, No. 1,837,033, and assigned to the Westinghouse Electric & Manufacturing Company, reactors were used, in combination with quick-acting breakers and overcurrent relays, to effect a distribution of the current supplied by the various portions of the system to a fault, such that the desired operation of the protective relays will result.

In the present invention, the reactors 44, 45 are used, in connection with impedance-responsive relays, as will subsequently be described, to provide the equivalent of distance, at each end of a section, so that we may utilize an impedance-responsive relay that can be made selective for faults occurring at distances up to only 80 or 90 percent of the impedance of the line-section. As no fault is likely to occur in the reactors themselves, we thus provided complete relay protection over the entire actual length of each line-section, by making the reactors 44, 45 large enough so that the range of impedance-values at which the impedance relays at the opposite ends of the line-sections are reliable terminates in said reactors, or, in general, in a substantially fault-free impedance in the line-section at the end remote from each relay. Substantially the same result may be obtained, in transmission systems in general, by insulating the line-sections very much more thoroughly at their ends than in the center; or, in the case of contact-wires for railway systems, by running out the feeders for some distance from the sectionalizing station before connecting them to the contact-wires.

In a system such as that described hereinabove, it is requisite that faults occurring on trolley conductors or, for that matter, on the substation buses, shall be isolated with the utmost possible dispatch. Such operation is necessary in order to avoid interference with communication circuits in the neighborhood of the railway. It is equally important, furthermore, that sound conductors remain connected to their sources of energy, even at times of fault on other conductors, in order to avoid unnecessary interruptions in service. It is desirable, therefore, that a protective system for a railway distribution circuit be characterized by high speed in operation and the utmost selectivity possible and, at the same time be dependent upon load conditions and upon the capacity of the connected generators, which are commonly added to the system and disconnected therefrom with the coming and passing of peak-load conditions of the railway system, so that the maximum load current of the peak-load conditions may be more than many fault-currents obtained during off-peak conditions.

It is the general object of our invention to provide a protective system having such characteristics and, in addition, to provide protection against the occurrence of a fault of any possible type.

The fundamentals of our protective system may be studied by reference to the legends applied to Fig. 1 which indicate the particular types of protective apparatus employed in connection with the various circuits. The circuit breakers for isolating various portions of the circuit, together with the relays which control their operation, are indicated by small circles. As indicated by the legend, the contact-line circuit breakers, such as 19 to 26, are controlled by a high-speed impedance relay of our invention having a load presetting coil which will be described in more detail later.

The transformer circuit breakers 32 to 39, inclusive, are controlled by ordinary reverse-power relays which are well known in the art, to protect against line-to-line faults. Differential relays are relied on to protect against transformer faults, and line grounds may be similarly guarded against, or voltage relays may be used for the latter purposes. The bus-tie circuit breakers 41 to 43, inclusive, are controlled by differential relays which operate, upon the occurrence of a fault on the substation bus, to trip all contact-line and transformer breakers, as well as the bus-tie breaker. The details of the various elements of the protective system indicated schematically in Fig. 1 will now be described.

Before proceeding to a detailed description of the apparatus, however, consideration will be given to the conditions obtaining on the system upon the occurrence of a ground fault on a trolley conductor. This condition is illustrated in Fig. 2 in which the transformers, circuit breakers, reactors, substation buses and the like are indicated by reference numerals corresponding to those employed in connection with Fig. 1. The legends applied to Fig. 2 indicate the voltage on the substation buses at stations 16 and 17 upon the occurrence of a fault at a point 46 on the trolley conductor 12 near the bus 28, as well as the magnitude of the currents flowing in the various conductors of the circuits under such conditions. A load is indicated at the point 47 to bring out the effect thereof upon circuit conditions at times of fault. It may be stated that the distribution circuit for which the system of our invention was designed provides for a normal trolley voltage of 12,000 volts.

Upon the occurrence of a ground fault at the point 46 and a load at the point 47 (Fig. 2), it may be observed that energy is fed to the fault from both directions. It will also be noticed that the energy-flow in the trolley conductor 12 between the adjacent bus 28 and the fault 46 will be in a direction which is opposite to that of the flow of energy in the other trolley conductors 13 to 15. This fact is made use of to prevent tripping of the other trolley-line circuit breakers 24 to 26, in a manner that will be explained later.

Referring now to Fig. 3, we will explain the details of our relay protective system. In Fig. 3, the high-tension transmission line, the step-down transformer, the transformer circuit breaker, sub-station bus, contact lines and the circuit breakers therein, are indicated by the same reference numerals as in Figs. 1 and 2. The operating mechanism for only the circuit breaker 23 of the trolley line 12 is shown in detail, but that of the other trolley-line circuit breakers 24 to 26 is identical and, therefore, omitted.

The protective apparatus of our invention includes a high-speed or "instantaneous" impedance-responsive or fault-distance-responsive relay 50 and a high-speed or "instantaneous" directional relay 51 which have their contacts 52 and 53 connected in series with a circuit including a source of energy, such as the battery 54, and the trip coil 55 of the circuit breaker 23. The impedance relay 50 is an improvement upon the impedance relay described in the patent to Crichton, No. 1,292,584 and comprises an actuating winding 54', which is adapted to be energized in accordance with the current traversing the conductor 12 to be isolated, and two restraining windings 55' and 55'' adapted to be energized in accordance with the voltage on said conductor. The current and voltage windings 54' and 55', 55'' are energized, respectively, from the current and potential transformers 56 and 57 associated with the conductor 12 and bus 28.

The voltage windings 55' and 55'' are made in two parts, with separate armatures, and with dephasing means such as a choke coil 57' in series with the winding 55' and a resistor 57'' in series with the other winding 55'', in order to increase the number or frequency of the force-pulsations on the relay 50, and also to reduce the magnitude of each impulse, thus reducing the tendency toward chattering, which is a serious difficulty in the design of impedance relays when they are made "instantaneous", by which we mean that their average time of operation is within from ½ cycle to ¾ cycle, or within one cycle on a 60-cycle system, or even less time, from the instant when the relay setting is exceeded.

In addition to the current and voltage windings, the impedance relay 50 is also provided with a load-presetting device comprising the winding 58 connected in series with the current winding 54'. The armature associated with the winding 58 is resiliently secured to the contact 52 of the relay 50 by means of a spring 58', for example, so that, when the winding 58 is energized, an additional restraining force is applied to the contact of the relay 50, requiring a stronger energization of the current-responsive actuating winding or a weaker energization of the voltage-responsive restraining winding to cause the closing of the contact 52 of the impedance relay. A time-delay device, such as a dash pot 59, prevents the load-presetting device from responding immediately to changes in the current flowing in the trolley line 12.

The instantaneous directional or reverse-energy relay is shown at 51 and comprises an E-shaped magnetic circuit or yoke 59a and a cooperating, centrally pivoted, contact-bearing armature 51'. The directional windings 61 and 61' of the reverse-energy relay 51 are disposed on the outer legs of the yoke 59a and are energized from the current transformer 56 in the trolley-line 12, the windings 61 and 61' being oppositely connected, so that one makes a north pole while the other makes a south pole at substantially the same instant.

The polarizing winding 60, which affords a basis for comparison to enable the reverse-energy relay to discriminate between the energy-flow in the trolley-line 12 in the direction away from the bus 28, and in the reverse direction, is disposed on the inner leg of the yoke 59a and is connected, according to the embodiment of our invention shown in the drawings, to be energized from a current-transformer 63 in the supply-circuit of the bus 28, which is preferable to its being energized from the potential transformer 57, as we at first connected it. The reason for this is that a severe fault will so pull down the voltage that the polarizing or discriminatory effect of the voltage coil of the reverse-energy relay, as formerly connected by us, would sometimes be masked by the over-powering strength of the current-responsive directional coils 61 at times of faults, whereas our present bus-supply current-responsive polarizing coil 60 affords a strong polarizing current at the times when such current is needed, giving the quick positive operation which must be obtained if the polarized relay is to be effective to open its contacts 53 and thus prevent the tripping of the line circuit breaker of any line-section in which the fault-current flows toward the adjacent bus, when the normal power current is away from the bus.

The bus-supply current-transformer 63 is placed in the grounded neutral secondary terminal circuit of the transformer 31, rather than on the high-potential or bus-terminal of the transformer secondary winding, so as to avoid the necessity for a high-voltage current transformer.

Connections are so made to the windings 60, 61 and 61' of the reverse-energy relay 51 that, as long as energy flows from the sectionalizing substation bus 28, or the relaying point, toward the trolley conductor 12, which is the normal direction of energy flow, the relay 51 will tend to close its contact 53. This follows from the substantially in-phase relation between the fluxes produced by the currents traversing the bus 28 and the circuit 12; by which we mean that the directional winding 61 which is nearer the contact 53 makes a south pole at substantially the same half-cycle that the polarizing winding 60 makes a north pole. Under these conditions, however, the closing of the contact 53 is ineffective so long as the impedance-relay contact 52 remains open. When the direction of energy flow is from the trolley conductors towards the bus 28, the phase relations of the voltage and current will be altered, and the fluxes produced by the windings 60 and 61 of the relay 51 will prevent the closing of its contact 53, or will "instantaneously" open the contact 53 if it was previously closed; that is, the remote directional winding 61' makes a south pole at substantially the same half-cycle that the polarizing winding 60 makes a north pole.

While the impedance relay 50 and the directional relay 51 are both "instantaneous", as distinguished from prior devices in which the relay at the end of the line-section nearest the fault had to trip its associated circuit-breaker before the more remote relays could discriminate between the sound and faulty line-sections, it will be understood that the directional relay 51 should operate to open its contact 53 substantially as quickly as, or preferably quicker than, the impedance relay operates to close its contact 52, or, in general, within about ½ cycle or even less time. It will be further understood that any necessary anti-chattering device, such as phase-shifting or adjusting shunts 63a, may be used in connection with the reverse-current relay 51, if it is not convenient to make the inertia of the rocking switch-arm or armature 51' sufficient for this purpose.

As shown in the drawings, the rocker-arm 51' of the polarized relay 51 may be provided with a weight or a biasing spring 61a for the purpose of making the opening action of the relay somewhat more rapid than its closing action, in order to enable the polarizing relay 51 to move faster than the impedance relay 50 on proper occasion, as heretofore explained.

In addition to the impedance relay 50 and the reverse energy relay 51, we also provide a differential current relay 62 which is adapted to be energized by the difference between the current supplied from the transformer 31 to the bus 28 and the sum of the currents in all the other conductors connected to the bus 28. The energization of the relay 62 is effected by suitable bridge connections which receive energy whenever the current flowing in the bus-supply current-transformer 63 is not substantially equal to the sum of the current in a plurality of current transformers 64 which are connected in the four trolley conductors 12 to 15 and in the bus-tie circuit of the bus-tie circuit breaker 42. The relay 62 has five contacts 65 which are adapted to control the circuits to the respective tripping coils 55 of the four trolley-line circuit breakers 23 to 26, as well as the tripping coil 66 of the transformer circuit-breaker 33 and the tripping coil 67 of the bus-tie circuit breaker 42, so as to completely isolate the bus 28 in the event of a bus fault.

Having described the apparatus which we utilize for the protection of a railway distribution system of the type described, we shall now explain the method of its operation under different conditions.

The impedance relay 50 has the well-known characteristic of operating when the impedance ratio of voltage to current falls below a predetermined minimum value; and by "impedance" we mean to include either the entire impedance of the line-section or any significant component thereof. The impedance relay 50 constitutes a means for estimating, and responding to, the distance of a fault from the sectionalizing station, because, at times of fault, the impedance of the line itself constitutes practically the entire impedance of the circuit, being almost wholly reactive, as is well known.

The addition of the load-presetting coil 58 to the impedance relay does not affect its impedance-responsive characteristic but changes the setting of the relay in accordance with the value of the current traversing the circuit immediately preceding the fault, instantaneous operation of the pre-setting coil 58 being prevented by the spring-and-dashpot connection 58′, 59. It is characteristic of load currents that they usually increase to their maximum value with less rapidity than fault currents. In ordinary practice, too, the load current will be built up by small increments as additional units are connected to the load circuit. As the load current thus builds up, usually accompanied by a corresponding increase in the total generator capacity connected to the line, the load-presetting coil is energized more strongly and exerts a greater restraining force on the movable element of the relay 50, which is thereby prevented from operating. In the case of a rapid increase in the current traversing the circuit, however, as at times of fault, the relay 50 will be operated because of the increased energization of its actuating coil 54′, since the restraining effect of the presetting element 58 is not immediately effective but requires that a certain time element, introduced by the dash pot 59, elapse before the presetting element becomes effective. It will be understood, however, that our load-presetting attachment is not always needed, and we do not desire to limit ourselves to its use.

It will be apparent, from the foregoing explanation, that the impedance relay 50, with the load presetting device 58, 59, is responsive only to the fault-current increments and, since the normal load current introduces a restraining effect proportional to its magnitude, the operation of the relay 50 is compensated for changes in the magnitude of the load connected to the circuit. Our system is thus freed from a serious disadvantage of earlier systems, namely, that, at times of heavy load, a high-impedance fault may trip the circuit breakers and, at times of light load, a low-impedance fault may not produce sufficient fault current to trip the circuit breakers.

The directional relay 51 operates, in the manner described heretofore, to prevent the tripping of the circuit breakers at all times when energy flows in the direction towards the adjacent sectionalizing bus at the switching station. Reference to Fig. 2 shows that, when a fault occurs near the end of any conductor, the direction of energy flow from all of the other conductors into that end of the faulty conductor will be toward the adjacent sectionalizing bus at that end, and, by the use of the directional relay 51, this fact is made use of to prevent the tripping of the circuit breakers in the sound conductors.

The differential relay 62 operates when a fault occurs on the substation bus 28, with the result that the current supplied to the bus from the transformer 31 differs from the total current supplied from the bus 28 to the conductors 12 to 15 and to the bus-tie circuit breaker 42. In such circumstances, the relay 62 causes the tripping of the trolley-line circuit-breakers 23 to 26, as well as the tripping of the transformer circuit-breaker 33 and the bus-tie circuit-breaker 42. In this manner bus faults are isolated promptly, and the circuits normally drawing energy from the faulty bus are fed from the adjoining substation.

A closed condition of both of the relays 50 and 51, of course, indicates a low-impedance fault, and the fact that the fault has occurred on the conductor with which the relays are associated. Under these conditions, the sectionalizing circuit breaker is immediately opened and the faulty line isolated. The impedance relay 50 measures the apparent impedance of the trolley-conductor circuit, automatically making adjustment, by means of the presetting device, for any load current then being supplied. This relay, then, determines the advisability of tripping the breaker from the standpoint of the current fed to the line. The directional relay 51 determines whether the energy supplied to the conductor is in the direction characteristic of a fault, and prevents the tripping of any circuit breaker in a line in which energy is not flowing away from the bus.

The remaining relays referred to in the legends applied to Fig. 1, and other details of the protective apparatus which would or might be used in actual practice, have not been described in detail since they are not necessary to an understanding of the innovations involved in our present invention. The novel features of our invention have been explained in the foregoing description and will be defined in the claims appended hereto.

The impedance element and the directional element per se are described and claimed respectively in two divisional applications, Serial Nos. 692,472 and 692,473, filed October 6, 1933.

While we have particularly described our protective relay system in an application to railway feeder circuits, it will be understood that the invention is applicable to other electric systems of transmission or distribution of power. Since alterations in the system of our invention, as shown and described herein, will, no doubt, occur to others, we do not wish to be limited to the specific embodiment disclosed, except as necessitated by the scope of the claims.

We claim as our invention:

1. In a protective system for a circuit of an electric-distribution system comprising a plurality of parallel-connected circuits and circuit interrupters in said circuits for isolating sections thereof, the combination with an instantaneous impedance relay having a current-responsive actuating winding, a voltage-responsive restraining winding and a current-responsive time-delay presetting winding, of an instantaneous directional relay having means for providing a magnetic flux-path current and voltage-responsive field-winding-means for producing cumulative magnetomotive forces in said magnetic flux-path only upon the flow of energy in a predetermined direction in said circuits, and movable-armature means in the field of said magnetomotive forces for closing a contact of the directional relay, and circuit-means jointly responsive to both of said relays for causing the tripping of said interrupters.

2. In an electric-distribution system comprising a plurality of parallel-connected circuits, means, including sectionalizing circuit breakers, for connecting said parallel-connected circuits to common sources of energy at the ends thereof, the combination including an instantaneous impedance relay having a voltage-responsive restraining winding and current-responsive actuating and presetting windings, and an instantaneous directional relay having means for providing a magnetic flux-path, differently responsive field-winding-means for producing opposing magnetomotive forces in said magnetic flux-path upon the flow of energy in said circuits in a predetermined direction, movable-armature means in the field of said magnetomotive forces for closing a directional-relay contact, and means for moving said armature in a contact-opening direction when said magnetomotive forces are opposed to each other, and circuit-means jointly responsive to both of said relays for controlling said circuit breakers.

3. In a protective system, an electric circuit, energy sources connected thereto, isolating circuit breakers disposed at its ends, and means, including an instantaneous impedance relay, for controlling the tripping of one of said breakers, said relay comprising current-responsive actuating and presetting windings and a voltage-responsive restraining winding.

4. In a protective system, an electric circuit, energy sources connected thereto at its ends, isolating circuit breakers therefor, and means, including an instantaneous directional relay, for controlling the tripping of one of said breakers, said relay having means for providing a magnetic flux-path, diversely responsive field winding-means for producing cumulative magnetomotive forces in said magnetic flux path, only upon the flow of energy in a predetermined direction in said circuit, and movable-armature means in the field of said magnetomotive forces for closing a contact of the directional relay.

5. In an electric distribution system, the combination with a substation bus and a feeder circuit and means, including a circuit breaker, for connecting the feeder circuit to the substation bus of means including a relay, for controlling said breaker, said relay having winding-means, and means for energizing said winding-means from the currents traversing both said bus and said feeder.

6. The combination with an instantaneously operating impedance-relay means for responding to a decrease in the impedance ratio of voltage to current in an alternating-current line below a predetermined critical value of said ratio, of a time-delay load presetting mechanism responsive to the current in said line for changing the setting of the associated impedance relay with respect to said predetermined critical value of said impedance ratio with each change in load but only after a time-interval sufficient to insure that the setting of the critical impedance ratio of the instantaneous impedance relay shall not be materially changed, upon the occurrence of a change in load, until after the instantaneous impedance relay has had a chance to operate if the critical ratio of the old setting is reached by reason of the changed load conditions.

7. A grounded sectionalized multi-circuit alternating-current electric distribution system having a common connecting bus at one end of one section, an electrically tripped line circuit-breaker means in each of the sectionalized circuits near the point of connection to said bus, and an electric translating device having a winding supplying energy to said bus, said winding having a grounded neutral terminal connection, each of the sectionalized circuits having an instantaneously operating impedance-relay means for responding to a decrease in the impedance ratio of voltage to current in its respective circuit below a predetermined critical value of said ratio, means responsive to the action of said impedance relay for energizing a tripping circuit for the associated line circuit breaker, a time-delay load presetting mechanism, for each sectionalized line, responsive to the current in said line, for changing the setting of the associated impedance relay with respect to said predetermined critical value of said impedance ratio with each change in load but only after a time-interval sufficient to insure that the setting of the critical impedance ratio of the instantaneous impedance relay shall not be materially changed, upon the occurrence of a change in load, until after the instantaneous impedance relay has had a chance to operate if the critical ratio of the old setting is reached by reason of the changed load conditions, and an instantaneously operating polarized directional-relay means associated with each of said impedance relays for preventing the tripping of its associated line circuit-breaker if the current in its associated sectionalized circuit is flowing toward the bus, characterized further by means for deriving the polarizing current for determining the directional response of said directional relay from a current transformer, said current transformer being disposed in the grounded neutral terminal connection of said translating device for supplying electrical energy to said bus.

8. A grounded sectionalized multi-circuit alternating-current electric distribution system having a common connecting bus at one end of one section, an electrically tripped line circuit-breaker means in each of the sectionalized circuits near the point of connection to said bus and an electric translating device haivng a winding supplying energy to said bus, said winding having a grounded neutral terminal connection, characterized by having, in each of the sectionalized circuits, an instantaneously operating impedance-relay means for responding to a decrease in the impedance ratio of voltage to current in its respective circuit below a predetermined critical value of said ratio, means responsive to the action of said impedance relay for energizing a tripping circuit for the associated line circuit breaker, and an instantaneously operating polarized directional-relay means associated with each of said impedance relays for preventing the tripping of its associated line circuit-breaker if the current in its associated sectionalized circuit is flowing toward the bus, characterized further by means for deriving the polarizing current for determining the directional response of said directional relay from a current transformer in the grounded neutral terminal connection of said translating device for supplying electrical energy to said bus.

9. A grounded sectionalized multi-circuit alternating-current electric distribution system having a common connecting bus at one end of one section, an electrically tripped line circuit-breaker in each of the sectionalized circuits near the point of connection to said bus, and an electric translating device having a winding supplying energy to said bus, characterized by having, in each of the sectionalized circuits, a means for quickly supplying a tripping current to its associated line circuit-breaker in response to abnormal line-current values, and an instantaneously operating polarized directional relay associated with each of the aforesaid tripping-current means for preventing the tripping of its associated line circuit-breaker if the current in its associated sectionalized circuit is flowing toward the bus, characterized further by means responsive to the current supplied to the bus by said translating device for deriving the polarizing current for determining the directional response of said directional relay.

10. The invention, as defined in claim 9, characterized by the fact that the means for deriving the polarizing current for determining the directional response of said directional relay is a current transformer in a grounded neutral terminal connection of said winding of said translating device for supplying electrical energy to said bus.

11. A grounded sectionalized multi-circuit alternating-current electric-distribution system having a common connecting bus at one end of one section, an electrically tripped line circuit-breaker in each of the sectionalized circuits near the point of connection to said bus, an electric translating device having a winding supplying energy to said bus, said winding having a grounded neutral terminal connection, and an electrically tripped bus circuit-breaker in circuit with said bus-supply translating device, characterized by having, in each of the sectionalized circuits, a means for quickly supplying a tripping current to its associated line circuit breaker in response to abnormal line-current values, an instantaneously operating polarized directional relay associated with each of the aforesaid tripping-current means for preventing the tripping of its associated line circuit-breaker if the current in its associated sectionalized circuit is flowing toward the bus, and means, including a differential-current relay, for supplying tripping currents to said circuit-breakers in response to any inequality between the current in said bus circuit-breaker and the summation of the currents in all of the other circuits connected to said bus, characterized further by the fact that the source of the polarizing current for determining the directional response of said directional relay and the comparison-current for responding to the current in said bus circuit-breaker in said differential-current relay is a current transformer in the grounded neutral terminal connection of said translating device for supplying electrical energy to said bus.

12. A grounded sectionalized multi-circuit alternating-current electric-distribution system having a common connecting bus at one end of one section, an electrically tripped line circuit-breaker in each of the sectionalized circuits near the point of connection to said bus, an electric translating device having a winding supplying energy to said bus, said winding having a grounded neutral terminal connection, and an electrically tripped bus circuit-breaker in circuit with said bus-supply translating device, characterized by having means, including a differential-current relay, for supplying tripping currents to said circuit breakers in response to any inequality between the current in said bus circuit-breaker and the summation of the currents in all of the other circuits connected to said bus, and characterized further by the fact that the source of the comparison-current for responding to the current in said bus circuit-breaker in said differential-current relay is a current transformer in the grounded neutral terminal connection of said translating device for supplying electrical energy to said bus.

13. A sectionalized alternating-current transmission line having a plurality of line-sections joined together at one station, each line-section having a sectionalizing circuit-breaker means at each end thereof and having instantaneous line-frequency-responsive impedance relaying means at each end thereof for tripping said circuit breaker means, each line-section also having a serially connected impedance device at each end thereof, each of said serially connected impedance devices being large enough so that the range of impedance-values at which the impedance relaying means at the other end of the line-section is reliable terminates in said serially connected impedance device.

14. A sectionalized transmission line having a plurality of line-sections joined together at one station, each line-section having a sectionalizing crcuit-breaker means at each end thereof and having instantaneous relaying means at each end thereof for tripping said circuit-breaker means, each line-section also having a serially connected impedance device at each end thereof, characterized by the fact that the instantaneous relaying means at said substation comprises instantaneous impedance-responsive distance relay apparatus having current-responsive actuating means and voltage-responsive restraining means, and instantaneous directional relay apparatus for rendering said instantaneous distance relay apparatus ineffective in response to the direction of current-flow when current is flowing in a predetermined direction.

15. A sectionalized transmission line having a plurality of line-sections joined together at one station, each line-section having a sectionalizing circuit-breaker means at each end thereof and having instantaneous impedance relaying means at each end thereof for tripping said circuit-breaker means, each line-section being provided at each end with a portion of its total impedance so designed that substantially no faults are expectable therein, said portion being so related to the whole and to the impedance-relay setting that the range of impedance-values at which each of said relays is reliable terminates in the fault-free impedance at the far end of the associated line-section.

16. A sectionalized transmission line having a plurality of line-sections joined together at one station, each line-section having a sectionalizing circuit-breaker means at each end thereof and having instantaneous impedance relaying means at each end thereof for tripping said circuit-breaker means, each line-section being provided at each end with a portion of its total impedance so designed that substantially no faults are expectable therein, said portion being so related to the whole and to the impedance-relay setting that the range of impedance-values at which each of said relays is reliable terminates in the fault-free impedance at the far end of the associated line-section, characterized by the instantaneous relaying means at said substation being associated with means for rendering them effective only for faults occurring in their own line-sections.

17. A sectionalized transmission line having a plurality of line-sections joined together at one station, each line-section having a sectionalizing circuit-breaker means at each end thereof and having instantaneous relaying means at each end thereof for tripping said circuit-breaker means, each line section also having instantaneous directional relaying means at each end thereof for selectively impeding the tripping operation only when the fault-current is flowing toward the sectionalizing station at which the relay means is located, characterized by the fact that said directional relaying means comprises a rocker-arm relay having a two-path magnetic circuit and two differently-excited field-winding flux-producing means associated therewith, whereby said relay shifts its flux from one side to the other as the current in the line-section reverses.

18. A sectionalized transmission line having a plurality of line-sections joined together at one station, each line-section having a sectionalizing circuit-breaker means at each end thereof and having instantaneous relaying means at each end thereof for tripping said circuit-breaker means, each line section also having instantaneous directional relaying means at each end thereof for selectively impeding the tripping operation only when the fault-current is flowing toward the sectionalizing station at which the relaying means is located, characterized by the fact that said directional relaying means comprises an E-shaped core member having a centrally pivoted rocker-arm armature and having two winding-means energized, respectively, from the line current and from a source of polarizing alternating current substantially in phase with the line current, one of said windings being disposed on the center leg of the core member and the other being in two coils disposed on the two outer legs and so connected that one coil forms a north pole at substantially the same instant that the other forms a south pole at the free ends of the respecive outer legs.

19. A sectionalized transmission line having a plurality of line-sections joined together at one station, each line-section having a sectionalizing circuit-breaker means at each end thereof and having instantaneous relaying means at each end thereof for tripping said circuit-breaker means, each line section also having instantaneous directional relaying means at each end thereof for selectively impeding the tripping operation only when the fault-current is flowing toward the sectionalizing station at which the relaying means is located, characterized by the fact that said directional relaying means comprises a rocker-arm relay which shifts its flux from one side to the other as the current in the line-section reverses, and has a biasing means for accelerating its movement to impeding position.

20. A sectionalized transmission line having a plurality of line-sections joined together at one station, each line-section having a sectionalizing circuit-breaker means at each end thereof and having instantaneous relaying means at each end thereof for tripping said circuit-breaker means, each line-section also having an auxiliary relaying means at each end thereof having contacts operative to selectively impede the tripping operation only when a fault is located in another line-section, characterized by the fact that said auxiliary relaying means comprises means for biasing it toward its impeding position.

21. An electrical system comprising parallel multi-circuit transmission lines, sectionalizing means comprising circuit-breaker means at each end of each section, means for interconnecting the parallel multi-circuit lines at one or more points, and quick-acting means for selectively opening the two circuit-breaker means at the two ends of a faulty section and no other circuit breakers in the event of a fault in one section, said selective quick-acting means comprising an instantaneous impedance relay and an instantaneous directional relay at each end of the section which is to be cleared.

22. A sectionalized alternating-current, commercial-frequency power-transmission line having a plurality of line-sections joined together at one station, each line-section having a sectionalizing circuit-breaker means at each end thereof and having instantaneous relaying means at each end thereof for tripping said circuit-breaker means, each line-section also having a serially connected impedance device at each end thereof, characterized by the fact that the instantaneous relaying means at said substation comprises line-frequency-responsive instantaneous impedance-responsive distance relay apparatus having current-responsive actuating means and voltage-responsive restraining means, and line-frequency-responsive instantaneous directional relay apparatus for rendering said instantaneous distance relay apparatus ineffective in response to the direction of current-flow when current is flowing in a predetermined direction.

23. In a protective system for one of a plurality of distribution conductors connected to a substation bus, a directional relay for controlling a circuit breaker for insolating said conductor comprising a plurality of windings, means for energizing said windings from the currents flowing in said conductor and said bus, respectively, said windings being so arranged and connected that said relay operates only when the energy traversing said conductor and bus flows from the bus.

24. A protective system for a power line comprising a plurality of line-sectionalizing interrupters, and individual instantaneous distance-responsive relay means and direction-responsive relay means jointly operative to open each interrupter, said direction-responsive relay comprising an E-shaped core member having a centrally pivoted rocker-arm armature and having two windings energized, respectively, from the line current and from a source of polarizing alternating current of the same frequency, one of said windings being in two coils disposed on the two outer legs and so connected that one coil forms a north pole at substantially the same instant that the other forms a south pole at the free ends of the respective outer legs, the other of said windings being disposed on the center leg.

25. A single-phase railway system comprising a plurality of substations, a plurality of trolley feeder lines connected in parallel between two substations, each trolley feeder having a circuit-interrupter at each end, and individual instantaneous distance-responsive relay means and direction-responsive relay means jointly operative to open each interrupter, said direction-responsive relay comprising an E-shaped core member having a centrally pivoted rocker-arm armature and having two windings energized, respectively, from the line current and from a source of polarizing alternating current of the same frequency, one of said windings being in two coils disposed on the two outer legs and so connected that one coil forms a north pole at substantially the same instant that the other forms a south pole at the free ends of the respective outer legs, the other winding being disposed on the center leg.

26. A sectionalized alternating-current, commercial-frequency power-transmission line having a plurality of line-sections joined together at one station, each line-section having a sectionalizing circuit-breaker means at each end thereof and having instantaneous relaying means at each end thereof for tripping said circuit-breaker means, each line-section also having a serially connected impedance device at each end thereof, characterized by the fact that the instantaneous relaying means at said substation comprises line-frequency-responsive instantaneous impedance-responsive distance relay apparatus having current-responsive actuating and presetting means and voltage-responsive restraining means, and line-frequency-responsive instantaneous directional relay apparatus for rendering said instantaneous distance relay apparatus ineffective in response to the direction of current-flow when current is flowing in a predetermined direction.

27. A relay comprising a substantially instantaneous fault-responsive element, and a substantially instantaneous directional element for rendering the other element ineffective at all times except when current is flowing in a predetermined direction.

28. In a distribution system including a feeder conductor adapted to be connected to a substation bus, a directional relay comprising a three-limb magnetic core, an armature pivoted on the center limb, and windings for exciting the parallel magnetic circuits constituted by said limbs, means for energizing said windings from currents traversing said conductor and bus, respectively, whereby said relay is maintained in its non-operated condition only when the direction of the flow of energy through said conductor is toward the bus.

LESLIE N. CRICHTON.
HERBERT C. GRAVES, Jr.